United States Patent
Cornell et al.

(10) Patent No.: US 7,258,088 B2
(45) Date of Patent: Aug. 21, 2007

(54) ENGINE VALVE ACTUATION SYSTEM (75) Inventors: Sean O. Cornell, Gridley, IL (US); Scott Alan Leman, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/298,517

(22) Filed: Dec. 12, 2005

(65) Prior Publication Data
US 2006/0086329 A1     Apr. 27, 2006

Related U.S. Application Data

(60) Division of application No. 10/283,373, filed on Oct. 30, 2002, now Pat. No. 7,004,122, which is a continuation-in-part of application No. 10/144,062, filed on May 14, 2002.

(51) Int. Cl.
*F01L 9/02* (2006.01)
(52) U.S. Cl. .................. 123/90.12; 123/90.13; 123/90.39
(58) Field of Classification Search ......... 123/90.12, 123/90.13, 90.39, 90.44
See application file for complete search history.

(56) References Cited

U.S. PATENT DOCUMENTS

| | | | |
|---|---|---|---|
| 3,250,068 A | 5/1966 | Vulliamy | |
| 4,020,809 A | 5/1977 | Kern et al. | |
| 4,033,304 A | 7/1977 | Luria | |
| 4,050,435 A | 9/1977 | Fuller, Jr. et al. | |
| 4,065,094 A | 12/1977 | Adams | |
| 4,150,640 A | 4/1979 | Egan | |
| 4,161,166 A | 7/1979 | Roznovsky | |
| 4,180,035 A | 12/1979 | Saiki et al. | |
| 4,206,728 A | 6/1980 | Trenne | |
| 4,211,107 A | 7/1980 | Sleeter et al. | |
| 4,296,911 A | 10/1981 | Escobosa | |
| 4,423,709 A | 1/1984 | Arrieta | |
| 4,424,790 A | 1/1984 | Curtil | |

(Continued)

FOREIGN PATENT DOCUMENTS

DE     44 40 289 A1     5/1996

(Continued)

OTHER PUBLICATIONS

Office Action dated Jun. 2, 2003, for U.S. Appl. No. 10/370,852; Amendment filed Jul. 10, 2003.

(Continued)

*Primary Examiner*—Ching Chang (57) ABSTRACT

An engine valve actuation system is provided. The engine valve actuation system includes an intake valve that is moveable between a first position to prevent a flow of fluid and a second position to allow a flow of fluid. A cam assembly is configured to move the intake valve between the first position and the second position. A fluid actuator is configured to selectively prevent the intake valve from moving to the first position. A source of fluid is in fluid communication with the fluid actuator. A directional control valve is configured to control a flow of fluid between the source of fluid and the fluid actuator. A fluid passageway connects the directional control valve with the fluid actuator. An accumulator is in fluid communication with the fluid passageway. A restricted orifice is disposed between the accumulator and the fluid passageway to restrict a flow of fluid between the accumulator and the fluid passageway.

6 Claims, 8 Drawing Sheets

U.S. PATENT DOCUMENTS

| | | |
|---|---|---|
| 4,474,008 A | 10/1984 | Sakurai et al. |
| 4,561,253 A | 12/1985 | Curtil |
| 4,572,114 A | 2/1986 | Sickler |
| 4,643,049 A | 2/1987 | Nishikawa et al. |
| 4,724,801 A | 2/1988 | O'Neill Cormac |
| 4,815,423 A | 3/1989 | Holmer |
| 4,833,971 A | 5/1989 | Kubik |
| 4,869,222 A | 9/1989 | Klassen |
| 4,974,566 A | 12/1990 | LoRusso et al. |
| 5,000,145 A | 3/1991 | Quenneville |
| 5,012,778 A | 5/1991 | Pitzi |
| 5,191,867 A | 3/1993 | Glassey |
| 5,193,495 A | 3/1993 | Wood |
| 5,255,641 A | 10/1993 | Schechter |
| 5,327,858 A | 7/1994 | Hausknecht |
| 5,333,456 A | 8/1994 | Bollinger |
| 5,335,633 A | 8/1994 | Thien |
| 5,363,816 A | 11/1994 | Yorita et al. |
| 5,379,743 A | 1/1995 | Stokes et al. |
| 5,408,979 A | 4/1995 | Backlund et al. |
| 5,445,128 A | 8/1995 | Letang et al. |
| 5,456,222 A | 10/1995 | Schechter |
| 5,479,890 A | 1/1996 | Hu et al. |
| 5,520,161 A | 5/1996 | Klopp |
| 5,531,192 A | 7/1996 | Feucht et al. |
| 5,537,976 A | 7/1996 | Hu |
| 5,546,914 A | 8/1996 | Scheinert |
| 5,549,095 A | 8/1996 | Goto et al. |
| 5,564,386 A | 10/1996 | Korte et al. |
| 5,576,963 A | 11/1996 | Ribbens et al. |
| 5,577,468 A | 11/1996 | Weber |
| 5,586,526 A | 12/1996 | Lindquist |
| 5,586,531 A | 12/1996 | Vittorio |
| 5,611,204 A | 3/1997 | Radovanovic et al. |
| 5,615,646 A | 4/1997 | Feucht |
| 5,619,965 A | 4/1997 | Cosma et al. |
| 5,645,030 A | 7/1997 | Letsche |
| 5,680,841 A | 10/1997 | Hu |
| 5,682,854 A | 11/1997 | Ozawa |
| 5,692,464 A | 12/1997 | Kimura |
| 5,713,331 A | 2/1998 | Eisenbacher et al. |
| 5,718,199 A | 2/1998 | Hu et al. |
| 5,724,939 A | 3/1998 | Faletti et al. |
| 5,732,678 A | 3/1998 | Lindquist et al. |
| 5,778,674 A | 7/1998 | Kimura |
| 5,787,859 A | 8/1998 | Meistrick et al. |
| 5,809,964 A | 9/1998 | Meistrick et al. |
| 5,813,231 A | 9/1998 | Faletti et al. |
| 5,816,216 A | 10/1998 | Egashira et al. |
| 5,829,397 A | 11/1998 | Vorih et al. |
| 5,839,400 A | 11/1998 | Vattaneo et al. |
| 5,839,453 A | 11/1998 | Hu |
| 5,857,438 A | 1/1999 | Bernard |
| 5,927,075 A | 7/1999 | Khair |
| 5,937,807 A | 8/1999 | Peters et al. |
| 5,967,115 A | 10/1999 | Konopka et al. |
| 6,000,374 A | 12/1999 | Cosma et al. |
| 6,003,316 A | 12/1999 | Baert et al. |
| 6,006,706 A | 12/1999 | Kanzaki |
| 6,012,424 A | 1/2000 | Meistrick |
| 6,020,651 A | 2/2000 | Nakamura et al. |
| 6,021,758 A | 2/2000 | Carey et al. |
| 6,026,786 A | 2/2000 | Groff et al. |
| 6,035,639 A | 3/2000 | Kolmanovsky et al. |
| 6,035,640 A | 3/2000 | Kolmanovsky et al. |
| 6,067,800 A | 5/2000 | Kolmanovsky et al. |
| 6,067,946 A | 5/2000 | Bunker et al. |
| 6,076,353 A | 6/2000 | Freudenberg et al. |
| 6,082,328 A | 7/2000 | Meistrick et al. |
| 6,095,127 A | 8/2000 | Kolmanovsky et al. |
| 6,101,998 A | 8/2000 | Tamura et al. |
| 6,128,902 A | 10/2000 | Kolmanovsky et al. |
| 6,135,073 A | 10/2000 | Feucht et al. |
| 6,148,778 A | 11/2000 | Sturman |
| 6,170,441 B1 | 1/2001 | Haldeman et al. |
| 6,178,749 B1 | 1/2001 | Kolmanovsky et al. |
| 6,189,504 B1 | 2/2001 | Israel et al. |
| 6,209,516 B1 | 4/2001 | Yamashita |
| 6,237,551 B1 | 5/2001 | Macor et al. |
| 6,244,257 B1 | 6/2001 | Hu |
| 6,257,183 B1 | 7/2001 | Vorih et al. |
| 6,267,107 B1 | 7/2001 | Ward |
| 6,273,076 B1 | 8/2001 | Beck et al. |
| 6,279,550 B1 | 8/2001 | Bryant |
| 6,301,887 B1 | 10/2001 | Gorel et al. |
| 6,301,889 B1 | 10/2001 | Gladden et al. |
| 6,302,076 B1 | 10/2001 | Bredy |
| 6,415,752 B1 | 7/2002 | Janak |
| 6,439,195 B1 | 8/2002 | Warner |
| 6,467,452 B1 | 10/2002 | Duffy et al. |
| 6,510,824 B2 * | 1/2003 | Vorih et al. ............. 123/90.12 |
| 6,571,765 B2 | 6/2003 | Kuboshima et al. |
| 6,601,563 B2 | 8/2003 | Funke et al. |
| 6,651,618 B1 | 11/2003 | Coleman et al. |
| 6,655,329 B2 * | 12/2003 | Kammerdiener et al. 123/90.16 |
| 6,655,349 B1 | 12/2003 | Cavanaugh |
| 6,668,773 B2 | 12/2003 | Holtman et al. |
| 6,688,280 B2 | 2/2004 | Weber et al. |
| 6,722,349 B2 | 4/2004 | Leman et al. |
| 6,732,685 B2 | 5/2004 | Leman |
| 6,772,742 B2 | 8/2004 | Lei et al. |
| 2001/0002379 A1 | 5/2001 | Schechter |
| 2001/0023671 A1 | 9/2001 | Vorih |
| 2002/0157623 A1 | 10/2002 | Turner et al. |
| 2003/0145810 A1 | 8/2003 | Leman et al. |
| 2004/0118118 A1 | 6/2004 | Weber et al. |
| 2004/0206331 A1 | 10/2004 | Leman |

FOREIGN PATENT DOCUMENTS

| | | |
|---|---|---|
| DE | 44 43 169 A1 | 6/1996 |
| DE | 4443169 A1 * | 6/1996 |
| DE | 10107698 | 8/2002 |
| EP | 455937 | 11/1991 |
| EP | 0945606 | 9/1999 |
| EP | 0 961 018 A1 | 12/1999 |
| GB | 1262075 | 2/1972 |
| JP | 05106415 A2 | 4/1993 |
| JP | 2000120457 A | 4/2000 |
| JP | 2000145484 A | 5/2000 |
| WO | WO9207173 | 4/1922 |
| WO | WO98/02653 | 1/1998 |
| WO | WO 01/20150 | 3/2001 |

OTHER PUBLICATIONS

Office Action dated Jun. 2, 2003, for U.S. Appl. No. 10/143,908; Reply to Office Action filed Sep. 2, 2003.

Co-pending U.S. Appl. No. 10/992,198; Title: Combustion Engine Including Fluidically-Driven Engine Valve Actuator U.S. Filing Date: Nov. 19, 2004.

Office Action dated May 28, 2004, U.S. Appl. No. 10/733,570; Amendment filed on Nov. 24, 2004.

Co-pending U.S. Appl. No. 10/992,137; Title: Combustion Engine Including Fluidically-Controlled Engine Valve Actuator U.S. Filing Date: Nov. 19, 2004.

Co-pending U.S. Appl. No. 10/933,300; Title: Air and Fuel Supply System for Combustion Engine U.S. Filing Date: Sep. 3, 2004.

Co-pending U.S. Appl. No. 10/992,074; Title: Combustion Engine Including Cam Phase-Shifting U.S. Filing Date: Nov. 19, 2004.

Co-pending U.S. Appl. No. 10/992,866; Title: Air and Fuel Supply System for Combustion Engine With Particulate Trap U.S. Filing Date: Nov. 19, 2004.

Co-pending U.S. Appl. No. 10/992,857; Title: Air and Fuel Supply System for Combustion Engine Operating at Optimum Engine Speed U.S. Filing Date: Nov. 19, 2004.

Co-pending U.S. Appl. No. 10/992,897; Title: Air and Fuel Supply System for Combustion Engine U.S. Filing Date: Nov. 19, 2004.

Co-pending U.S. Appl. No. 10/993,065; Title: Air and Fuel Supply System for Combustion Engine Operating in HCCI Mode U.S. Filing Date: Nov. 19, 2004.

Co-pending U.S. Appl. No. 10/992,070; Title: Combustion Engine Including Exhaust Purification With On-Board Ammonia Production U.S. Filing Date: Nov. 19, 2004.

Co-pending U.S. Appl. No. 10/992,071; Title: Combustion Engine Including Engine Valve Actuation System U.S. Filing Date: Nov. 19, 2004.

Co-pending U.S. Appl. No. 10/992,069; Title: Air and Fuel Supply System for Combustion Engine U.S. Filing Date: Nov. 19, 2004.

Co-pending U.S.Appl. No. 10/992,125; Title: Air and Fuel Supply System for a Combustion Engine U.S. Filing Date: Nov. 19, 2004.

Office Action dated Jul. 26, 2004, for U.S. Appl. No. 10/309,312.

Reply to Office Action dated Oct. 7, 2004, for U.S. Appl. No. 10/309,312.

Office Action dated Dec. 2, 2004, for U.S. Appl. No. 10/309,312.

Appeal Brief Under 37 C.F.R. § 41.37, for U.S. Appl. No. 10/309,312.

Co-pending U.S. Appl. No. 10/309,312; Title: Engine Valve Actuation System U.S. Filing Date: Dec. 4, 2002.

Office Action dated Aug. 30, 2003, for U.S. Appl. No. 10/144,062.

Reply to Office Action dated Sep. 2, 2003, for U.S. Appl. No. 10/144,062.

Office Action dated Oct. 9, 203, for U.S. Appl. No. 10/144,062.

Reply to Office Action dated Feb. 9, 2004, for U.S. Appl. No. 10/144,062.

Office Action dated Apr. 8, 2004, for U.S. Appl. No. 10/144,062.

Reply to Office Action dated Jun. 24, 2004, for U.S. Appl. No. 10/144,062.

Co-pending U.S. Appl. No. 10/144,062; Title: Engine Valve Actuation System U.S. Filing Date: May 14, 2002.

Edwards et al., "The Potential of a Combined Miller Cycle and Internal EGR Engine for Future Heavy Duty Truck Applications," The Engineering Society for Advancing Mobility Land Sea Air and Space International, International Congress and Exposition, Feb. 23-26, 1998, pp. 1-19.

Obert, "Internal Combustion Engines and Air Pollution," Based on Internal Combustion Engines, Third Edition, 1973, pp. 612-614.

Challen et al., "Diesel Engine Reference Book, Section Edition," SAE International, 1999, pp. 75, 81, 84, 146, and 263-305.

Yorihiro Fukuzawa et al., "Development of High Efficiency Miller Cycle Gas Engine", Mitsubishi Heavy Industries, Ltd., Technical Review, vol. 38, No. 3, Oct. 2001, pp. 146-150.

Request for *Inter Partes* Reexamination Transmittal Form for US Patent 6,688,280, and Attachment to Request for *Inter Partes* Reexamination Transmittal Form, Sep. 17, 2004.

Request for *Inter Partes* Reexamination Transmittal Form for US Patent 6,651,618, and Attachment to Request for *Inter Partes* Reexamination Form, Aug. 27, 2004.

\* cited by examiner

ENGINE VALVE ACTUATION SYSTEM

RELATED APPLICATIONS

This application is a divisional of U.S. patent application Ser. No. 10/283,373 filed on Oct. 30, 2002, now U.S. Pat. No. 7,004,122 which is a continuation-in-part of application Ser. No. 10/144,062 filed on May 14, 2002 for Engine Valve Actuation System, both of which are incorporated herein by reference.

TECHNICAL FIELD

The present invention is directed to an engine valve actuation system. More particularly, the present invention is directed to a valve actuation system for an internal combustion engine.

BACKGROUND

The operation of an internal combustion engine, such as, for example, a diesel, gasoline, or natural gas engine, may cause the generation of undesirable emissions. These emissions, which may include particulates and nitrous oxide (NOx), are generated when fuel is combusted in a combustion chamber of the engine. An exhaust stroke of an engine piston forces exhaust gas, which may include these emissions from the engine. If no emission reduction measures are in place, these undesirable emissions will eventually be exhausted to the environment.

Research is currently being directed towards decreasing the amount of undesirable emissions that are exhausted to the environment during the operation of an engine. It is expected that improved engine design and improved control over engine operation may lead to a reduction in the generation of undesirable emissions. Many different approaches, such as, for example, engine gas recirculation and aftertreatments, have been found to reduce the amount of emissions generated during the operation of an engine. Unfortunately, the implementation of these emission reduction approaches typically results in a decrease in the overall efficiency of the engine.

Additional efforts are being focused on improving engine efficiency to compensate for the efficiency loss due to the emission reduction systems. One such approach to improving the engine efficiency involves adjusting the actuation timing of the engine valves. For example, the actuation timing of the intake and exhaust valves may be modified to implement a variation on the typical diesel or Otto cycle known as the Miller cycle. In a "late intake" type Miller cycle, the intake valves of the engine are held open during a portion of the compression stroke of the piston.

The engine valves in an internal combustion engine are typically driven by a cam arrangement that is operatively connected to the crankshaft of the engine. The rotation of the crankshaft results in a corresponding rotation of a cam that drives one or more cam followers. The movement of the cam followers results in the actuation of the engine valves. The shape of the cam governs the timing and duration of the valve actuation. As described in U.S. Pat. No. 6,237,551 to Macor et al., issued on May 29, 2001, a "late intake" Miller cycle may be implemented in such a cam arrangement by modifying the shape of the cam to overlap the actuation of the intake valve with the start of the compression stroke of the piston.

However, a late intake Miller cycle may be undesirable under certain operating conditions. For example, a diesel engine operating on a late intake Miller cycle will be difficult to start when the engine is cold. This difficulty arises because diesel fuel combustion is achieved when an air and fuel mixture is pressurized to a certain level. Implementation of the late intake Miller cycle reduces the amount of air and the amount of compression within each combustion chamber. The reduced compression combined with the reduced temperature of the engine results in a lower maximum pressure level of the air and fuel mixture. Thus, achieving combustion in a cold engine operating on a late intake Miller cycle may prove difficult.

As noted above, the actuation timing of a valve system driven by a cam arrangement is determined by the shape of the driving cam. Because the shape of the cam is fixed, this arrangement is inflexible and may not be changed during the operation of the engine. In other words, a conventional cam driven valve actuation system may not be modified to account for different operating conditions of the engine.

The intake valve actuation system of the present invention solves one or more of the problems set forth above.

SUMMARY OF THE INVENTION

In one aspect, the present invention is directed to an engine valve actuation system that includes an intake valve that is moveable between a first position to prevent a flow of fluid and a second position to allow a flow of fluid. A cam assembly is configured to move the intake valve between the first position and the second position. A fluid actuator is configured to selectively prevent the intake valve from moving to the first position. A source of fluid is in fluid communication with the fluid actuator. A directional control valve is configured to control a flow of fluid between the source of fluid and the fluid actuator. A fluid passageway connects the directional control valve with the fluid actuator. An accumulator is in fluid communication with the fluid passageway. A restricted orifice is disposed between the accumulator and the fluid passageway to restrict a flow of fluid between the accumulator and the fluid passageway.

In another aspect, the present invention is directed to a method of controlling an engine having a piston moveable through an intake stroke followed by a compression stroke. A cam is rotated to move an intake valve between a first position to prevent a flow of fluid and a second position to allow a flow of fluid during the intake stroke of the piston. Fluid is directed through a directional control valve and a fluid passageway to a fluid actuator associated with the intake valve when the intake valve is moved from the first position. The directional control valve is actuated to selectively prevent fluid from flowing through the fluid passageway from the fluid actuator to thereby prevent the intake valve from moving to the first position during at least a portion of the compression stroke of the piston. Fluid is directed from the fluid passageway through a restricted orifice to an accumulator to inhibit oscillations in the fluid actuator.

DETAILED DESCRIPTION

Figure 1:
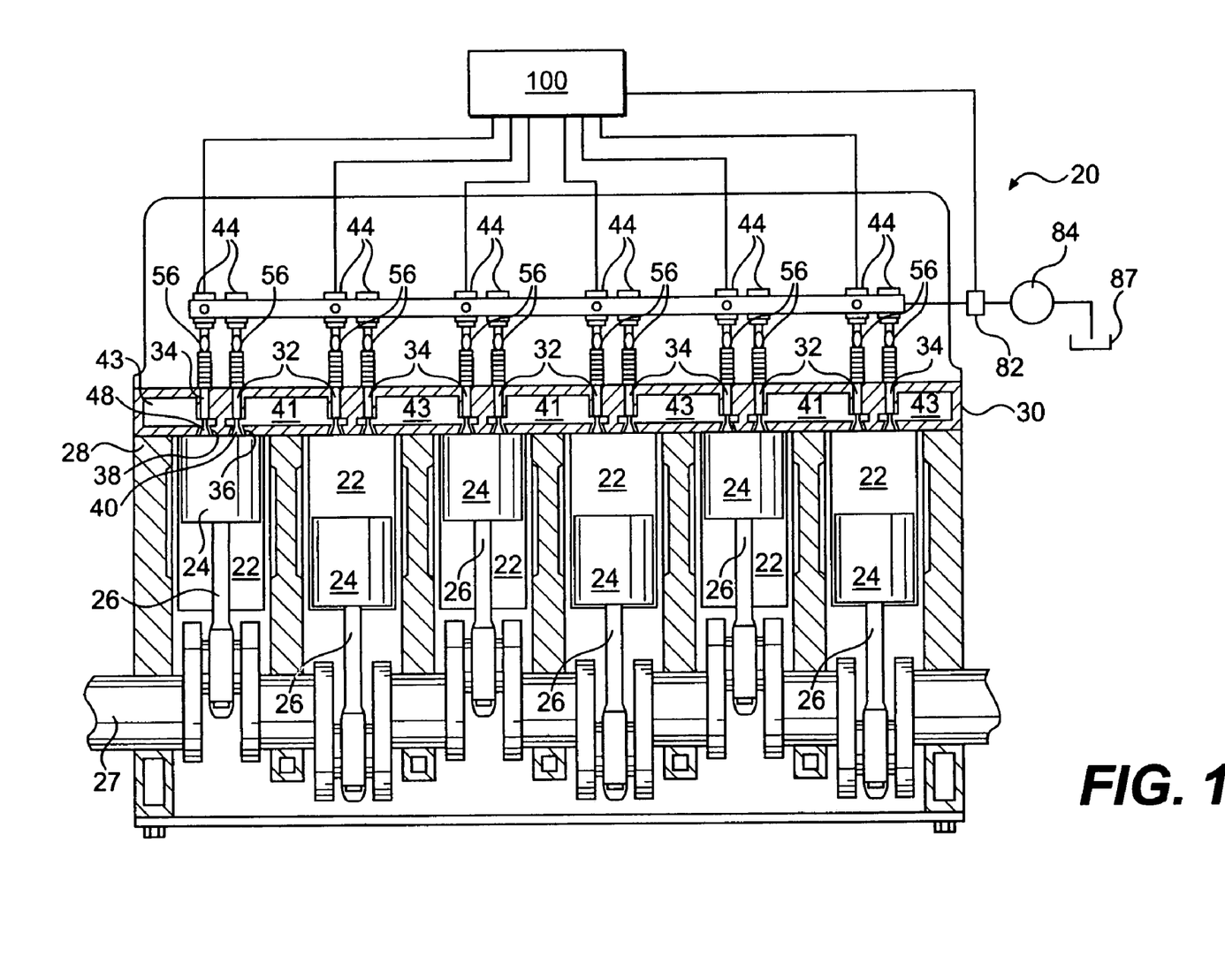
FIG. 1 is a diagrammatic cross-sectional view of an exemplary embodiment of an internal combustion engine.

An exemplary embodiment of an internal combustion engine 20 is illustrated in FIG. 1. For the purposes of the present disclosure, engine 20 is depicted and described as a four stroke diesel engine. One skilled in the art will recognize, however, that engine 20 may be any other type of internal combustion engine, such as, for example, a gasoline or natural gas engine.

As illustrated in FIG. 1, engine 20 includes an engine block 28 that defines a plurality of cylinders 22. A piston 24 is slidably disposed within each cylinder 22. In the illustrated embodiment, engine 20 includes six cylinders 22 and six associated pistons 24. One skilled in the art will readily recognize that engine 20 may include a greater or lesser number of pistons 24 and that pistons 24 may be disposed in an "in-line" configuration, a "V" configuration, or any other conventional configuration.

As also shown in FIG. 1, engine 20 includes a crankshaft 27 that is rotatably disposed within engine block 28. A connecting rod 26 connects each piston 24 to crankshaft 27. Each piston 24 is coupled to crankshaft 27 so that a sliding motion of piston 24 within the respective cylinder 22 results in a rotation of crankshaft 27. Similarly, a rotation of crankshaft 27 will result in a sliding motion of piston 24.

Engine 20 also includes a cylinder head 30. Cylinder head 30 defines an intake passageway 41 that leads to at least one intake port 36 for each cylinder 22. Cylinder head 30 may further define two or more intake ports 36 for each cylinder 22.

An intake valve 32 is disposed within each intake port 36. Intake valve 32 includes a valve element 40 that is configured to selectively block intake port 36. As described in greater detail below, each intake valve 32 may be actuated to move or "lift" valve element 40 to thereby open the respective intake port 36. In a cylinder 22 having a pair of intake ports 36 and a pair of intake valves 32, the pair of intake valves 32 may be actuated by a single valve actuation assembly or by a pair of valve actuation assemblies.

Cylinder head 30 also defines at least one exhaust port 38 for each cylinder 22. Each exhaust port 38 leads from the respective cylinder 22 to an exhaust passageway 43. Cylinder head 30 may further define two or more exhaust ports 38 for each cylinder 22.

An exhaust valve 34 is disposed within each exhaust port 38. Exhaust valve 34 includes a valve element 48 that is configured to selectively block exhaust port 38. As described in greater detail below, each exhaust valve 34 may be actuated to move or "lift" valve element 48 to thereby open the respective exhaust port 38. In a cylinder 22 having a pair of exhaust ports 38 and a pair of exhaust valves 34, the pair of exhaust valves 34 may be actuated by a single valve actuation assembly or by a pair of valve actuation assemblies.

Figure 2:
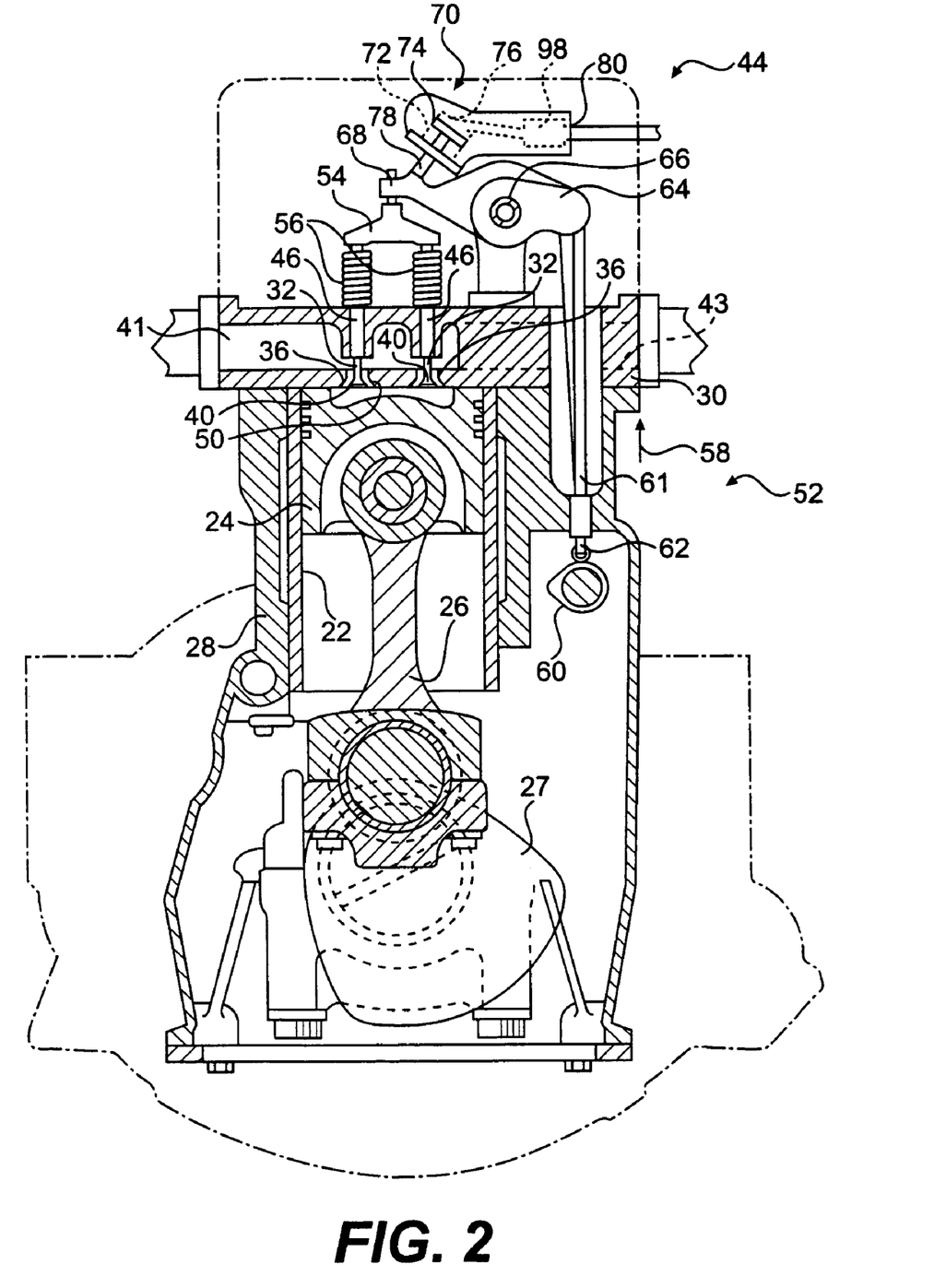
FIG. 2 is a diagrammatic cross-sectional view of a cylinder and valve actuation assembly in accordance with an exemplary embodiment of the present invention.

FIG. 2 illustrates an exemplary embodiment of one cylinder 22 of engine 20. As shown, cylinder head 30 defines a pair of intake ports 36 connecting intake passageway 41 to cylinder 22. Each intake port 36 includes a valve seat 50. One intake valve 32 is disposed within each intake port 36. Valve element 40 of intake valve 32 is configured to engage valve seat 50. When intake valve 32 is in a closed position, valve element 40 engages valve seat 50 to close intake port 36 and block fluid flow relative to cylinder 22. When intake valve 32 is lifted from the closed position, intake valve 32 allows a flow of fluid relative to cylinder 22.

Similarly, cylinder head 30 may define two or more exhaust ports 38 (only one of which is illustrated in FIG. 1) that connect cylinder 22 with exhaust passageway 43. One exhaust valve 34 is disposed within each exhaust port 38. A valve element 48 of each exhaust valve 34 is configured to close exhaust port 38 when exhaust valve 34 is in a closed position and block fluid flow relative to cylinder 22. When exhaust valve 34 is lifted from the closed position, exhaust valve 32 allows a flow of fluid relative to cylinder 22.

As also shown in FIG. 2, a valve actuation assembly 44 is operatively associated with intake valves 32. Valve actuation assembly 44 includes a bridge 54 that is connected to each valve element 40 through a pair of valve stems 46. A spring 56 may be disposed around each valve stem 46 between cylinder head 30 and bridge 54. Spring 56 acts to bias both valve elements 40 into engagement with the respective valve seat 50 to thereby close each intake port 36.

Valve actuation assembly 44 also includes a rocker arm 64. Rocker arm 64 is configured to pivot about a pivot 66. One end 68 of rocker arm 64 is connected to bridge 54. The opposite end of rocker arm 64 is connected to a cam assembly 52. In the exemplary embodiment of FIG. 2, cam assembly 52 includes a cam 60 having a cam lobe and mounted on a cam shaft, a push rod 61, and a cam follower 62. One skilled in the art will recognize that cam assembly 52 may have other configurations, such as, for example, where cam 60 acts directly on rocker arm 64.

Valve actuation assembly 44 may be driven by cam 60. Cam 60 is connected to crankshaft 27 so that a rotation of crankshaft 27 induces a corresponding rotation of cam 60. Cam 60 may be connected to crankshaft 27 through any means readily apparent to one skilled in the art, such as, for example, through a gear reduction assembly (not shown). As one skilled in the art will recognize, a rotation of cam 60 will cause cam follower 62 and associated push rod 61 to periodically reciprocate between an upper and a lower position.

The reciprocating movement of push rod 61 causes rocker arm 64 to pivot about pivot 66. When push rod 61 moves in the direction indicated by arrow 58, rocker arm 64 will pivot and move bridge 54 in the opposite direction. The movement of bridge 54 causes each intake valve 32 to lift and open intake ports 36. As cam 60 continues to rotate, springs 56 will act on bridge 54 to return each intake valve 32 to the closed position.

In this manner, the shape and orientation of cam 60 controls the timing of the actuation of intake valves 32. As one skilled in the art will recognize, cam 60 may be configured to coordinate the actuation of intake valves 32 with the movement of piston 24. For example, intake valves 32 may be actuated to open intake ports 36 when piston 24 is withdrawing within cylinder 22 to allow air to flow from intake passageway 41 into cylinder 22.

A similar valve actuation assembly may be connected to exhaust valves 34. A second cam (not shown) may be connected to crankshaft 27 to control the actuation timing of exhaust valves 34. Exhaust valves 34 may be actuated to open exhaust ports 38 when piston 24 is advancing within cylinder 22 to allow exhaust to flow from cylinder 22 into exhaust passageway 43.

As shown in FIG. 2, valve actuation assembly 44 also includes a fluid actuator 70. Fluid actuator 70 includes an actuator cylinder 72 that defines an actuator chamber 76. An actuator piston 74 is slidably disposed within actuator cylinder 72 and is connected to an actuator rod 78. A return spring 75 (referring to FIG. 8) may act on actuator piston 74 to return actuator piston 74 to a home position. Actuator rod 78 is engageable with an end 68 of rocker arm 64.

A fluid line 80 is connected to actuator chamber 76. Pressurized fluid may be directed through fluid line 80 into actuator chamber 76 to move actuator piston 74 within actuator cylinder 72. Movement of actuator piston 74 causes actuator rod 78 to engage end 68 of rocker arm 64. Fluid may be introduced to actuator chamber 76 when intake valves 32 are in the open position to move actuator rod 78 into engagement with rocker arm 64 to thereby hold intake valves 32 in the open position. Alternatively, fluid may be introduced to actuator chamber 76 when intake valves 32 are in the closed position to move actuator rod 78 into engagement with rocker arm 64 and pivot rocker arm 64 about pivot 66 to thereby open intake valves 32.

Figure 3A:
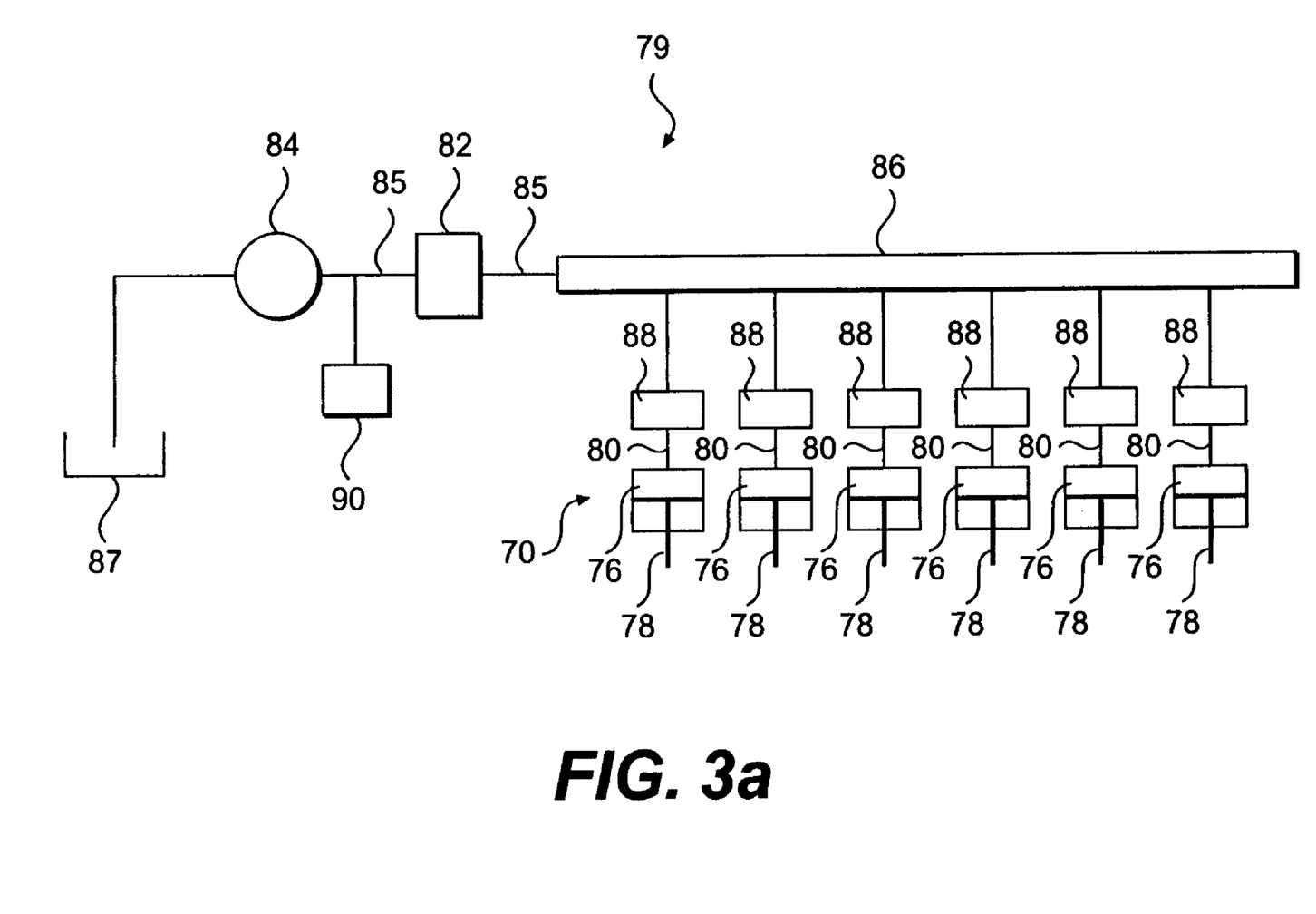
FIG. 3a is a schematic and diagrammatic representation of a fluid supply system for a fluid actuator for an engine valve in accordance with an exemplary embodiment of the present invention.

As illustrated in FIGS. 1 and 3, a source of fluid 84, which is connected to a tank 87, supplies pressurized fluid to fluid actuator 70. Tank 87 may store any type of fluid readily apparent to one skilled in the art, such as, for example, hydraulic fluid, fuel, or transmission fluid. Source of fluid 84 may be part of a lubrication system, such as typically accompanies an internal combustion engine. Such a lubrication system may provide pressurized oil having a pressure of, for example, less than 700 KPa (100 psi) or, more particularly, between about 210 KPa and 620 KPa (30 psi and 90 psi). Alternatively, the source of fluid may be a pump configured to provide oil at a higher pressure, such as, for example, between about 10 MPa and 35 MPa (1450 psi and 5000 psi).

A fluid supply system 79 connects source of fluid 84 with fluid actuator 70. In the exemplary embodiment of FIG. 3a, source of fluid 84 is connected to a fluid rail 86 through fluid line 85. A control valve 82 is disposed in fluid line 85. Control valve 82 may be opened to allow pressurized fluid to flow from source of fluid 84 to fluid rail 86. Control valve 82 may be closed to prevent pressurized fluid from flowing from source of fluid 84 to fluid rail 86.

As illustrated in FIG. 3a, fluid rail 86 supplies pressurized fluid from source of fluid 84 to a series of fluid actuators 70. Each fluid actuator 70 may be associated with either the intake valves 32 or the exhaust valves 34 of a particular engine cylinder 22 (referring to FIG. 1). Fluid lines 80 direct pressurized fluid from fluid rail 86 into the actuator chamber 76 of each fluid actuator 70.

A directional control valve 88 may be disposed in each fluid line 80. Each directional control valve 88 may be opened to allow pressurized fluid to flow between fluid rail 86 and actuator chamber 76. Each directional control valve 88 may be closed to prevent pressurized fluid from flowing between fluid rail 86 and actuator chamber 76. Directional control valve 88 may be normally biased into a closed position and actuated to allow fluid to flow through directional control valve 88. Alternatively, directional control valve 88 may be normally biased into an open position and actuated to prevent fluid from flowing through directional control valve 88. One skilled in the art will recognize that directional control valve 88 may be any type of controllable valve, such as, for example a two coil latching valve.

Figure 3B:
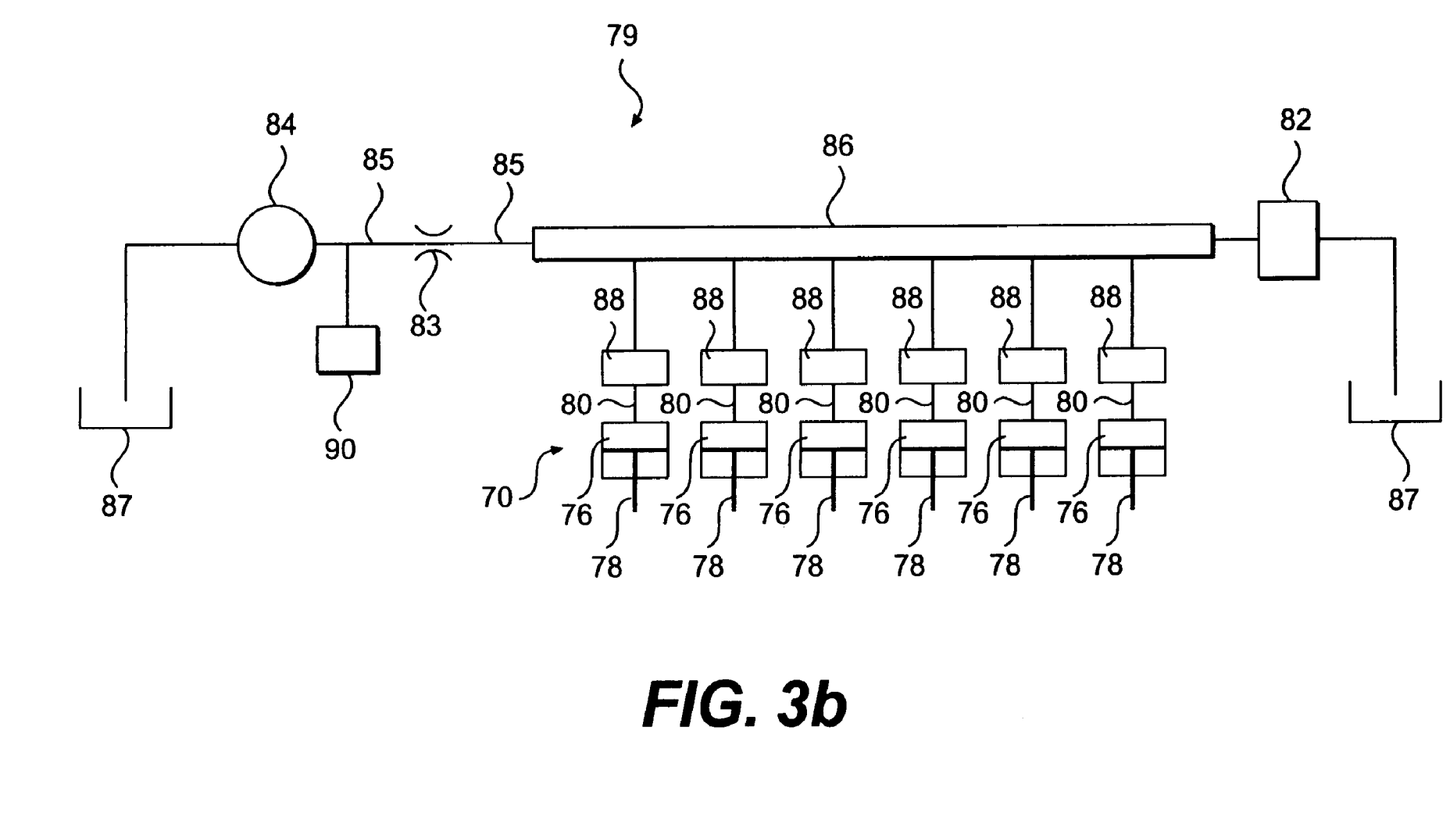
FIG. 3b is a schematic and diagrammatic representation of another embodiment of a fluid supply system for a fluid actuator for an engine valve in accordance with an exemplary embodiment of the present invention.

One skilled in the art will recognize that fluid supply system 79 may have a variety of different configurations. For example, as illustrated in FIG. 3b, a restrictive orifice 83 may be positioned in fluid line 85 between source of fluid 84 and a first end of fluid rail 86. Control valve 82 may be connected to an opposite end of fluid rail 86 and lead to tank 87. Control valve 82 may be opened to allow a flow of fluid through restrictive orifice 83 and fluid rail 86 to tank 87. Control valve 82 may be closed to allow a build up of pressure in the fluid within fluid rail 86.

Figure 4A:
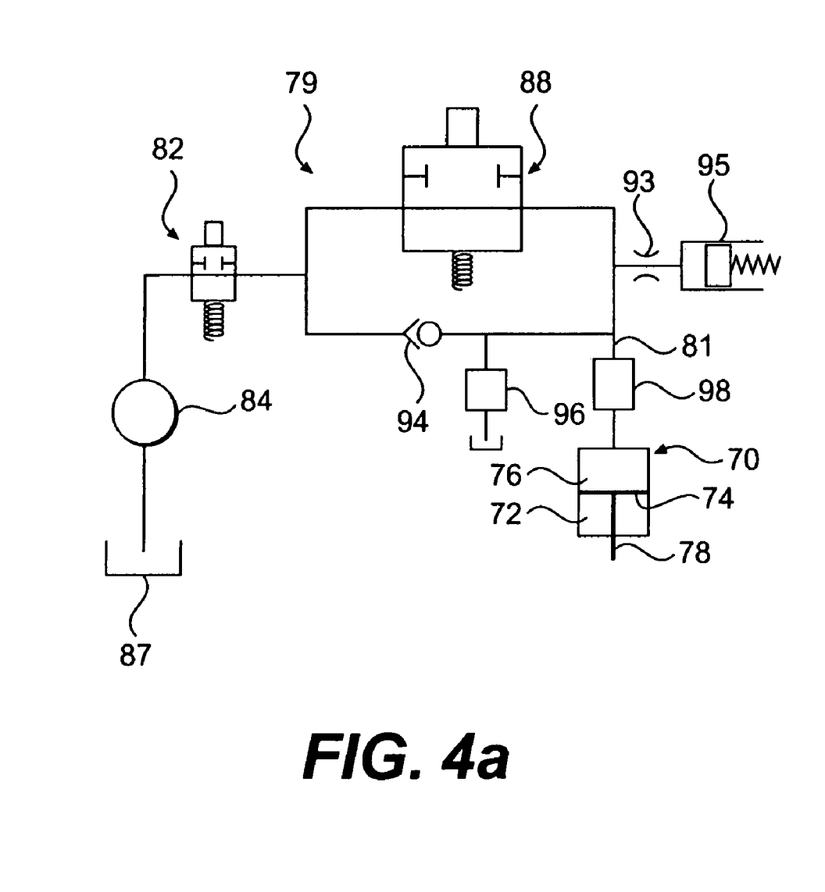
FIG. 4a is a schematic and diagrammatic representation of a fluid supply system for a fluid actuator in accordance with another exemplary embodiment of the present invention.

In addition, as illustrated in FIG. 4a, fluid supply system 79 may include a check valve 94 placed in parallel with directional control valve 88 between control valve 82 and fluid actuator 70. Check valve 94 may be configured to allow fluid to flow in the direction from control valve 82 to fluid actuator 70.

Figure 6:
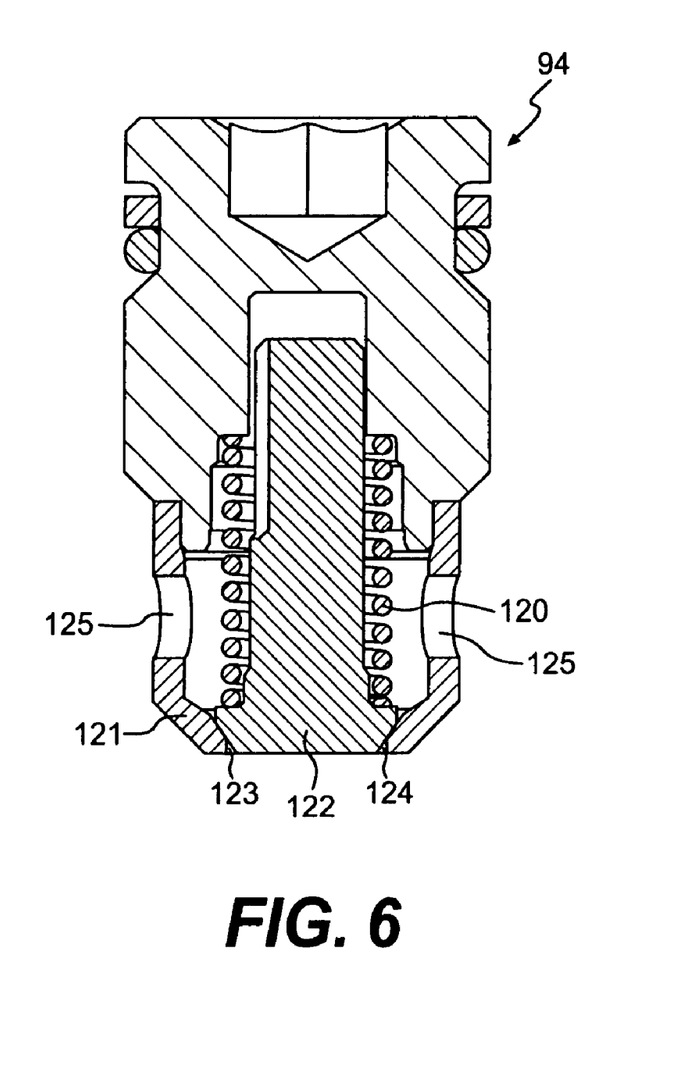
FIG. 6 is a cross-sectional view of an exemplary embodiment of a check valve for a fluid actuator in accordance with an embodiment of the present invention.

As shown in FIG. 6, check valve 94 may be a poppet style check valve. Check valve 94 includes a housing 121 that defines an inlet passageway 123 and includes a seat 124. A poppet 122 is adapted to sealingly engage seat 124. A spring 120 acts on poppet 122 to engage poppet 122 with seat 124. Poppet 122 may be disengaged with seat 124 to create a fluid passage between inlet passageway 123 and a fluid outlet 125.

Check valve 94 will open when poppet 122 is exposed to a pressure differential that is sufficient to overcome the force of spring 120. Poppet 122 will disengage from seat 124 when a force exerted by pressurized fluid in inlet passageway 123 is greater than the combination of a force exerted by fluid in fluid outlet 125 and the force of spring 120. If, however, the combination of the force exerted by fluid in fluid outlet 125 and the force of spring 120 is greater than the force exerted by the pressurized fluid in inlet passageway 123, poppet 122 will remain engaged with seat 124. In this manner, check valve 94 may ensure that fluid flows only from control valve 82 to fluid actuator 70, i.e. from inlet passageway 123 to fluid outlet 125. One skilled in the art will recognize that other types of check valves, such as, for example, a ball-type check valve or a plate-type check valve, may also be used.

As also shown in FIG. 4a, fluid supply system 79 may include an air bleed valve 96. Air bleed valve 96 may be any device readily apparent to one skilled in the art as capable of allowing air to escape a hydraulic system. For example, air bleed valve 96 may be a spring biased ball valve that allows air to flow through the valve, but closes when exposed to fluid pressure.

In addition, a snubbing valve 98 may be disposed in fluid line 81 leading to actuator chamber 76. Snubbing valve 98 may be configured to restrict the flow of fluid through fluid line 81. For example, snubbing valve 98 may be configured to decrease the rate at which fluid exits actuator chamber 76 to thereby slow the rate at which intake valve 32 closes.

Figure 7:
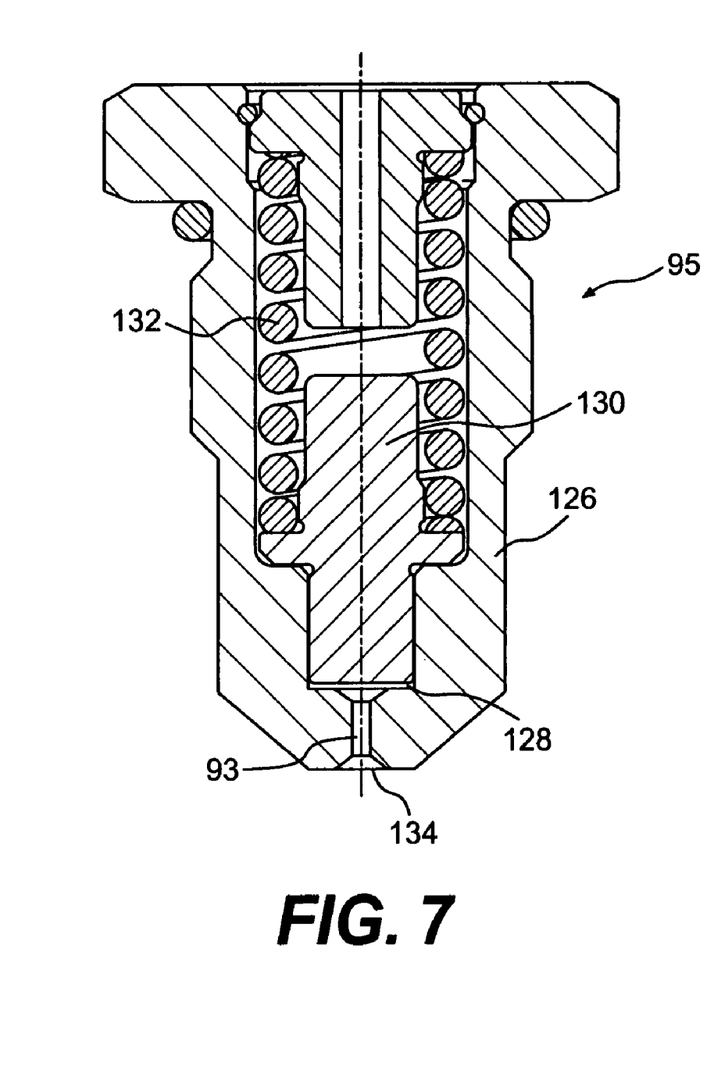
FIG. 7 is a cross-sectional view of an exemplary embodiment of an accumulator for a fluid actuator in accordance with an embodiment of the present invention.

Fluid supply system 79 may also include an accumulator 95. An exemplary embodiment of accumulator 95 is illustrated in FIG. 7. As shown, accumulator 95 includes a housing 126 that defines a chamber 128. A piston 130 is slidably disposed in chamber 128. A spring 132 is disposed in housing 126 and acts on piston 130 to move piston 130 relative to housing 126 to minimize the size of chamber 128. One skilled in the art may recognize that other types of accumulators, such as for example, a bladder-type accumulator, may also be used.

As also shown in FIG. 7 a restrictive orifice 93 may be disposed in an inlet 134 to accumulator 95. Restrictive orifice 93 is configured to restrict the rate at which fluid may flow between accumulator chamber 128 and inlet 134. As described in greater detail below, the combination of accumulator 95 and restrictive orifice 93 may act to dampen pressure oscillations in actuator chamber 76 and fluid line 80, which may cause actuator piston 74 to oscillate.

The components of fluid actuator 70 may be contained within a single housing that is mounted on engine 20 to allow actuator rod 78 to engage rocker arm 64. Alternatively, the components of fluid actuator 70 may be contained in separate housings. One skilled in the art will recognize that space considerations will impact the location of the components of fluid actuator 70 relative to engine 20.

Figure 8:
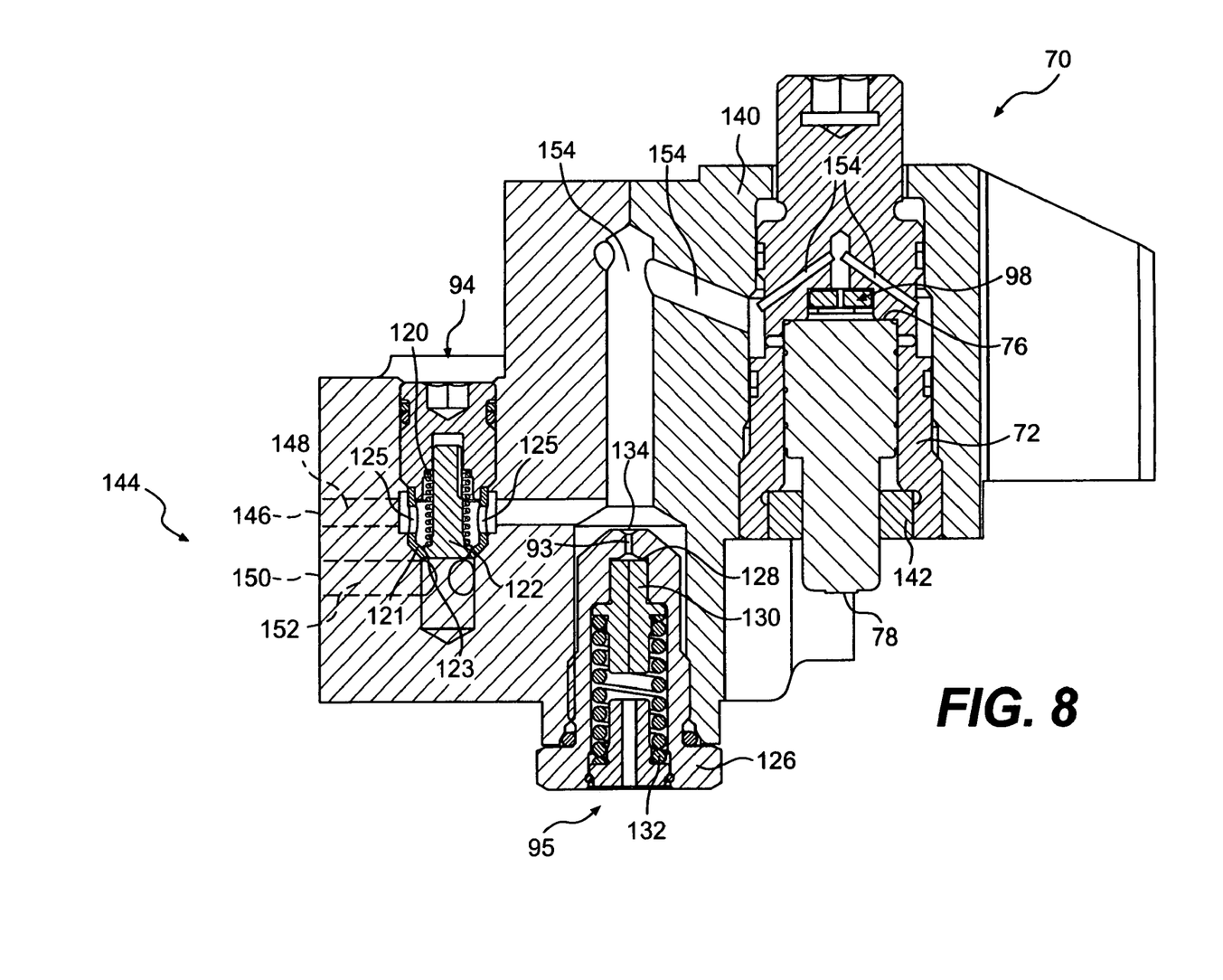
FIG. 8 is a side sectional view of a fluid actuator in accordance with an exemplary embodiment of the present invention.

An exemplary embodiment of a housing 140 for fluid actuator 70 is illustrated in FIG. 8. Housing 140 includes an inlet 144. In the illustrated embodiment, inlet 144 includes a first opening 146 that leads to a first fluid passageway 148 and a second opening 150 that leads to a second fluid passageway 152. Each of the first and second fluid passageways 148 and 152 lead from inlet 144 to a third fluid passageway 154. One skilled in the art will recognize that inlet 144 may have alternative configurations. For example, inlet 144 may include a single opening that leads to a single passageway that subsequently divides into first and second passageways 148 and 152.

Check valve 94 may be disposed in first fluid passageway 148 between inlet 144 and third fluid passageway 154. As discussed previously, check valve 94 may allow fluid to flow from inlet 144 to third fluid passageway 154. Check valve 94 may prevent fluid from flowing from third fluid passageway 154 to inlet 144.

Directional control valve 88 (referring to FIG. 4a) may be disposed proximate second opening 150. Direction control valve 88 controls the flow of fluid through second fluid passageway 152. Directional control valve 88 may be opened to allow fluid to flow in either direction through second fluid passageway 152.

Accumulator 95 may be disposed proximate third fluid passageway 154 so that inlet 134 of accumulator 95 opens to third fluid passageway 154. This allows fluid from either first or second fluid passageway 148 or 152 to flow through inlet 134 to accumulator 95. Restricted orifice 93 restricts the amount of fluid that may flow from third fluid passageway 154 into accumulator 95.

As also illustrated in FIG. 8, snubbing valve 98 is positioned between third fluid passageway 154 and actuator chamber 76. Snubbing valve 98 controls the rate at which fluid may flow into and out of actuator chamber 76. Snubbing valve 98 may be configured to allow a high rate of fluid flow into actuator chamber 76 when piston 74 moves away from a home position. Similarly, snubbing valve 98 may allow a high rate of fluid flow from actuator chamber 76 when piston 74 starts moving from the end position towards the home position. Snubbing valve 98 may slow the rate of fluid flow from actuator chamber 76 when piston 74 approaches the home position. In this manner, snubbing valve 98 may reduce the impact speed of intake valve 32 with valve seat 50.

Figure 4B:
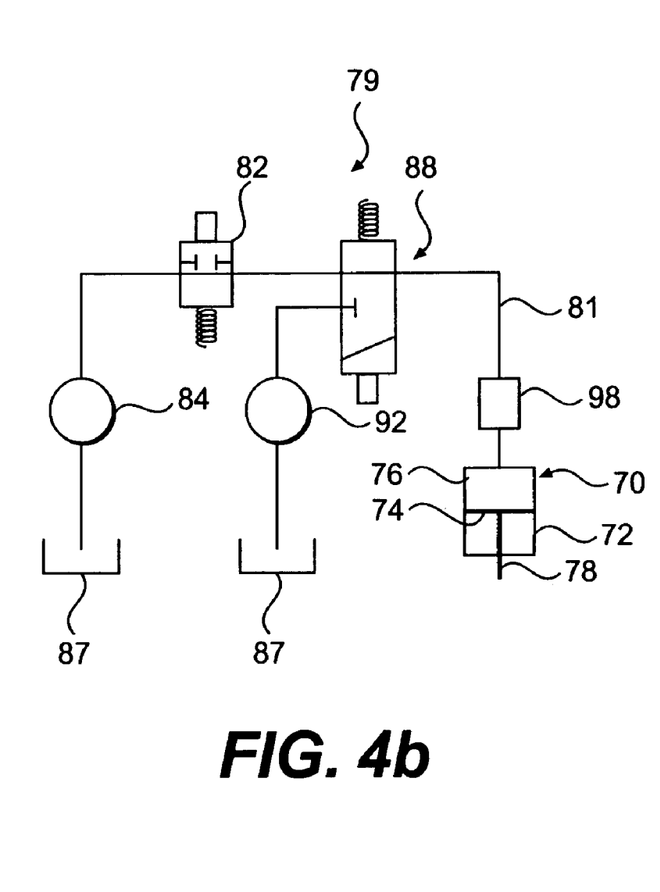
FIG. 4b is a schematic and diagrammatic representation of a fluid supply system for a fluid actuator in accordance with another exemplary embodiment of the present invention.

Another exemplary embodiment of a fluid supply system 79 is illustrated in FIG. 4b. As shown, fluid supply system 79 includes a source of high pressure fluid 92. Directional control valve 88 is configured to selectively connect either source of pressure fluid 84 or source of high pressure fluid 92 with fluid line 81. In this manner, either low or high pressure fluid may be directed to fluid actuator 70 to meet the needs of the current operating conditions. Directional control valve 88 may be normally biased into a position where source of fluid 84 is connected with fluid line 81.

As shown in FIG. 1, a controller 100 is connected to each valve actuation assembly 44 and to control valve 82. Controller 100 may include an electronic control module that has a microprocessor and a memory. As is known to those skilled in the art, the memory is connected to the microprocessor and stores an instruction set and variables. Associated with the microprocessor and part of electronic control module are various other known circuits such as, for example, power supply circuitry, signal conditioning circuitry, and solenoid driver circuitry, among others.

Controller 100 may be programmed to control one or more aspects of the operation of engine 20. For example, controller 100 may be programmed to control the valve actuation assembly, the fuel injection system, and any other function readily apparent to one skilled in the art. Controller 100 may control engine 20 based on the current operating conditions of the engine and/or instructions received from an operator.

Controller 100 may be further programmed to receive information from one or more sensors operatively connected with engine 20. Each of the sensors may be configured to sense one or more operational parameters of engine 20. For example, with reference to FIG. 3a, a sensor 90 may be connected with fluid supply system 79 to sense the temperature of the fluid within fluid supply system 79. One skilled in the art will recognize that many other types of sensors may be used in conjunction with or independently of sensor 90. For example, engine 20 may be equipped with sensors configured to sense one or more of the following: the temperature of the engine coolant, the temperature of the engine, the ambient air temperature, the engine speed, the load on the engine, and the intake air pressure.

Figure 5:
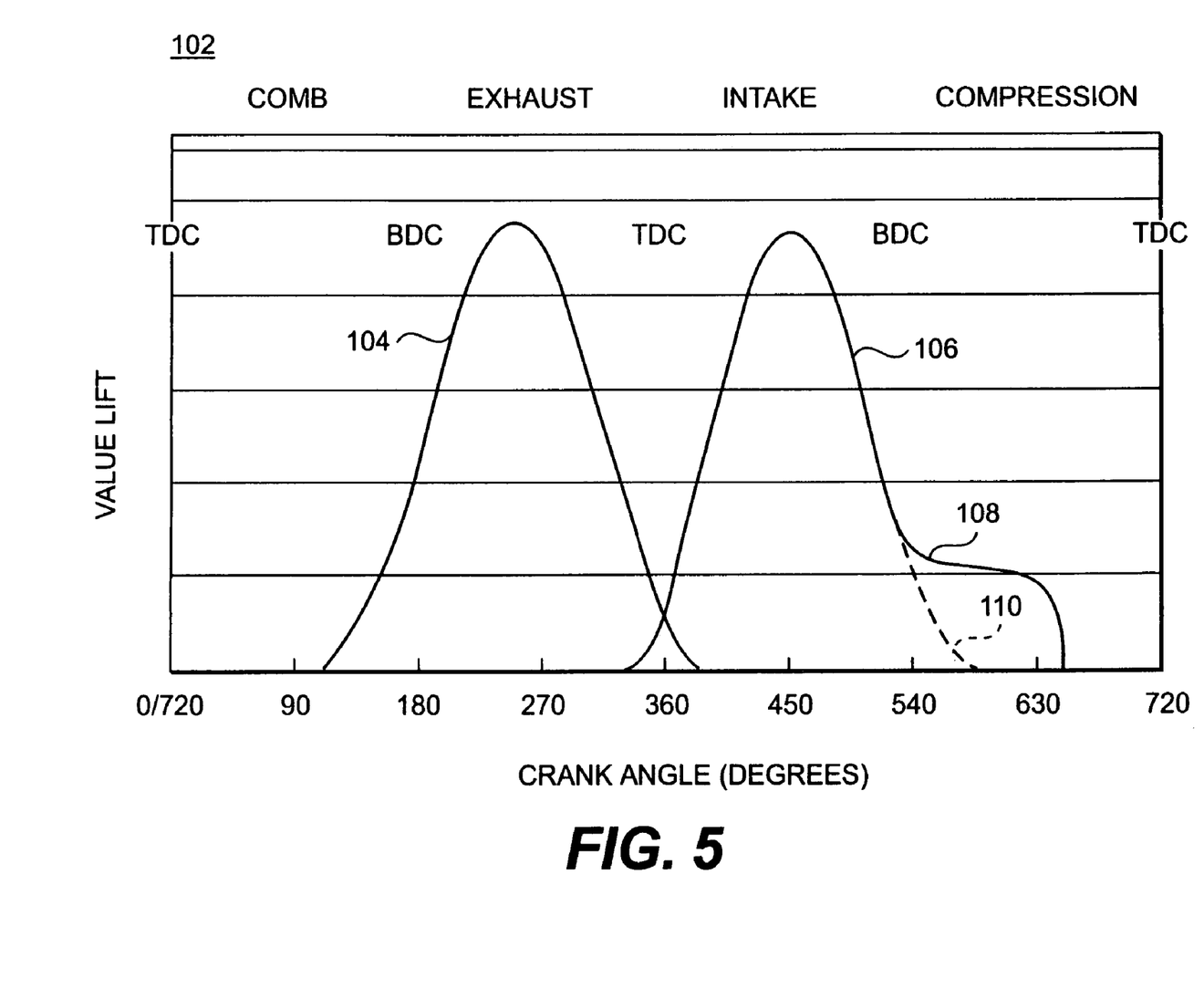
FIG. 5 is a graphic illustration of an exemplary valve actuation as a function of engine crank angle for an engine operating in accordance with the present invention.

Engine 20 may be further equipped with a sensor configured to monitor the crank angle of crankshaft 27 to thereby determine the position of pistons 24 within their respective cylinders 22. The crank angle of crankshaft 27 is also related to actuation timing of intake valves 32 and exhaust valves 34. An exemplary graph 102 indicating the relationship between valve actuation timing and crank angle is illustrated in FIG. 5. As shown by graph 102, exhaust valve actuation 104 is timed to substantially coincide with the exhaust stroke of piston 24 and intake valve actuation 106 is timed to substantially coincide with the intake stroke of piston 24.

INDUSTRIAL APPLICABILITY

Based on information provided by the engine sensors, controller 100 may operate each valve actuation assembly 44 to selectively implement a late intake Miller cycle for each cylinder 22 of engine 20. Under normal operating conditions, implementation of the late intake Miller cycle will increase the overall efficiency of the engine 20. Under some operating conditions, such as, for example, when engine 20 is cold, controller 100 may operate engine 20 on a conventional diesel cycle.

The following discussion describes the implementation of a late intake Miller cycle in a single cylinder 22 of engine 22. One skilled in the art will recognize that the system of the present invention may be used to selectively implement a late intake Miller cycle in all cylinders of engine 22 in the same or a similar manner. In addition, the system of the present invention may be used to implement other valve actuation variations on the conventional diesel cycle, such as, for example, an exhaust Miller cycle.

When engine 20 is operating under normal operating conditions, controller 100 implements a late intake Miller cycle by selectively actuating fluid actuator 70 to hold intake valve 32 open for a first portion of the compression stroke of piston 24. This may be accomplished by moving control valve 82 and directional control valve 88 to the open positions when piston 24 starts an intake stroke. This allows pressurized fluid to flow from source of fluid 84 through fluid rail 86 and into actuator chamber 76. The force of the fluid entering actuator chamber 76 moves actuator piston 74 so that actuator rod 78 follows end 68 of rocker arm 64 as rocker arm 64 pivots to open intake valves 32. The distance and rate of movement of actuator rod 78 will depend upon the configuration of actuator chamber 76 and fluid supply system 79. When actuator chamber 76 is filled with fluid and rocker arm 64 returns intake valves 32 from the open position to the closed position, actuator rod 78 will engage end 68 of rocker arm 64.

Fluid supply system 79 may be configured to supply a flow rate of fluid to fluid actuator 70 to fill actuator chamber 76 before cam 60 returns intake valves 32 to the closed position. In the embodiment of fluid supply system 79 illustrated in FIG. 4a, pressurized fluid may flow through both directional control valve 88 and check valve 94 into actuator chamber 76. Alternatively, directional control valve 88 may remain in a closed position and fluid may flow through check valve 94 into actuator cylinder 76.

When actuator chamber 76 is filled with fluid, controller 100 may close directional control valve 88. This prevents fluid from escaping from actuator chamber 76. As cam 60 continues to rotate and springs 56 urge intake valves 32 towards the closed position, actuator rod 78 will engage end 68 of rocker arm and prevent intake valves 32 from closing. As long as directional control valve 88 remains in the closed position, the trapped fluid in actuator chamber 76 will prevent springs 56 from returning intake valves 32 to the closed position. Thus, fluid actuator 70 will hold intake valves 32 in the open position, independently of the action of cam assembly 52.

When actuator rod 78 engages rocker arm 64 to prevent intake valves 32 from closing, the force of springs 56 acting through rocker arm 64 may cause an increase in the pressure of the fluid within fluid system 79. In response to the increased pressure, a flow of fluid will be throttled through restricted orifice 93 into chamber 128 of accumulator 95. The throttling of the fluid through restricted orifice 93 will dissipate energy from the fluid within fluid system 79.

The force of the fluid entering accumulator 95 will act to compress spring 132 and move piston 130 to increase the size of chamber 128. When the pressure within fluid system 79 decreases, spring 130 will act on piston 130 to force the fluid in chamber 128 back through restricted orifice 93. The flow of fluid through restricted orifice 93 into third fluid passageway 154 will also dissipate energy from fluid system 79.

Restricted orifice 93 and accumulator 95 will therefore dissipate energy from the fluid system 79 as fluid flows into and out of accumulator 95. In this manner, restricted orifice 93 and accumulator may absorb or reduce the impact of pressure fluctuations within fluid system 79, such as may be caused by the impact of rocker arm 64 on actuator rod 78. By absorbing or reducing pressure fluctuations, restricted orifice 93 and accumulator 95 may act to inhibit or minimize oscillations in actuator rod 78.

Controller 100 may close intake valves 32 by opening directional control valve 88. This allows the pressurized fluid to flow out of actuator chamber 76. The force of springs 56 forces the fluid from actuator chamber 76, thereby allowing actuator piston 74 to move within actuator cylinder 72. This allows rocker arm 64 to pivot so that intake valves 32 are moved to the closed position. Snubbing valve 98 may restrict the rate at which fluid exits actuator chamber 76 to reduce the velocity at which intake valves 32 are closed. This may prevent valve elements 40 from being damaged when closing intake ports 36.

An exemplary late intake closing 108 is illustrated in FIG. 5. As shown, the intake valve actuation 106 is extended into a portion of the compression stroke of piston 24. This allows some of the air in cylinder 22 to escape. The amount of air allowed to escape cylinder 22 may be controlled by adjusting the crank angle at which directional control valve 88 is opened. Directional control valve 88 may be closed at an earlier crank angle to decrease the amount of escaping air or at a later crank angle to increase the amount of escaping air.

As noted previously, certain operating conditions may require that engine 20 be operated on a conventional diesel cycle instead of the late intake Miller cycle described above. These types of operating conditions may be experienced, for example, when engine 20 is first starting or is otherwise operating under cold conditions. The described valve actuation system 44 allows for the selective disengagement of the late intake Miller cycle.

In the exemplary embodiment of FIG. 3a, controller 100 may disengage the late intake Miller cycle by closing control valve 82. Control valve 82 may be closed when controller 100 receives sensory input indicating that engine 20 is starting or is operating under cold conditions. Closing control valve 82 prevents fluid from flowing from source of fluid 84 into actuator chamber 76. Without the introduction of fluid to actuator chamber 76, fluid actuator 70 will not prevent intake valves 32 from returning to the closed position in response to the force of springs 56.

Thus, when control valve 82 is closed, intake valves 32 will follow a conventional diesel cycle as governed by cam 60. As shown in FIG. 5, intake valve actuation 106 will follow a conventional closing 110. In the conventional closing 110, the closing of intake valves 32 substantially coincides with the end of the intake stroke of piston 24. When intake valves 32 close at the end of the intake stroke, no air will be forced from cylinder 22 during the compression stroke. This results in piston 24 compressing the fuel and air mixture to a higher pressure, which will facilitate diesel fuel combustion. This is particularly beneficial when engine 20 is operating in cold conditions.

In the exemplary embodiment of FIG. 3b, controller 100 may disengage the Miller cycle by opening control valve 82. Control valve 82 may be opened when controller 100 receives sensory input indicating that engine 20 is starting or is operating under cold conditions. Opening control valve 82 allows fluid to flow through restrictive orifice 83 and fluid rail 86 to tank 87. Opening control valve 82 may therefore reduce the pressure of the fluid within fluid rail 86. The decreased pressure of the fluid within fluid rail 86 may not generated a force having a force great enough to move actuator piston 74. Thus, fluid actuator 70 will not engage intake valve 32 to prevent intake valve from closing. Accordingly, engine 20 will operate on a conventional diesel cycle as governed by cam 60.

Opening control valve 82 may also increase the responsiveness of valve actuator 70 when engine 20 is starting or operating under cold conditions. If the fluid within fluid rail 86 is cold, the fluid will have an increased viscosity. The increased viscosity of the fluid may decrease the rate at which the fluid may flow into and out of actuator chamber 76 and thereby impact the operation of valve actuator 70. By opening control valve 82, the cold fluid may be replaced by warmer fluid from source of fluid 84. This may decrease the viscosity of the fluid within fluid rail 86, which may increase the responsiveness of valve actuator 70 when control valve 82 is closed to operate engine 20 on the Miller cycle.

Restrictive orifice 83 may ensure that the pressure of the fluid upstream of restrictive orifice 83, i.e. between source of fluid 84 and restrictive orifice 83, does not decrease when control valve 82 is opened. Restrictive orifice 83 may create a smaller opening than is created by the opening of control valve 82. In other words, the opening of control valve 82 allows fluid to flow out of fluid rail 86 at a faster rate than restrictive orifice 83 allows fluid to flow into fluid rail 86. This creates a pressure drop over restrictive orifice 83 where the pressure of the fluid on the upstream side of restrictive orifice 83 will be greater that the pressure of the fluid in fluid rail 86. Thus, opening control valve 82 will not impact the pressure of fluid upstream of restrictive orifice 83.

As will be apparent from the foregoing description, the present invention provides an engine valve actuation system that may selectively alter the timing of the intake and/or exhaust valve actuation of an internal combustion engine. The actuation of the engine valves may be based on sensed operating conditions of the engine. For example, the engine valve actuation system may implement a late intake Miller cycle when the engine is operating under normal operating conditions. The late intake Miller cycle may be disengaged when the engine is operating under adverse operating conditions, such as when the engine is cold. Thus, the present invention provides a flexible engine valve actuation system that provides for both enhanced cold starting capability and fuel efficiency gains.

It will be apparent to those skilled in the art that various modifications and variations can be made in the engine valve actuation system of the present invention without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A fluid actuator for selectively preventing an engine valve from closing, comprising:
    a housing having an inlet, a snubbing valve chamber, an actuator chamber, a first fluid passageway connecting the inlet with the snubbing valve chamber, a second fluid passageway connecting the inlet with the snubbing valve chamber, and a third fluid passageway connecting the snubbing valve chamber with the actuator chamber;
    a snubbing valve disposed in the snubbing valve chamber and adapted to control a flow rate of fluid through the third fluid passageway;
    a check valve disposed in the first fluid passageway and adapted to allow a flow of fluid from the inlet through the first fluid passageway to the snubbing valve chamber and to prevent a flow of fluid from the snubbing valve chamber through the first fluid passageway to the inlet;
    an accumulator in fluid communication with the first and second fluid passageways;
    a restricted orifice disposed between the first and second fluid passageways and the accumulator; and
    a piston having an actuator rod and being disposed in the actuator chamber, the piston adapted to move the actuator rod into an engine valve actuation position in response to an introduction of fluid to the actuator chamber.

2. The actuator of claim 1, wherein the inlet includes a first opening for the first fluid passageway and a second opening for the second fluid passageway.

3. The actuator of claim 1, further including a spring acting on the piston to move the actuator rod away from the engine valve actuation position.

4. The actuator of claim 1, wherein the accumulator includes a chamber, a piston moveable between a first position where the volume of the chamber is minimized and a second position where the volume of the chamber is maximized, and a spring acting on the piston to bias the piston towards the first position.

5. The actuator of claim 1, wherein the check valve includes a seat, a poppet, and a spring acting on the poppet to engage the poppet with the seat.

6. The actuator of claim 1, further including a piston stop adapted to stop the piston when the actuator rod reaches the engine valve actuation position.

* * * * *